UNITED STATES PATENT OFFICE 2,502,109

STABILIZATION OF EDIBLE FATS, OILS, AND FOODS CONTAINING FATS AND OILS

Frederik D. Tollenaar, Utrecht, Netherlands, assignor to Nederlandse Organisatie voor Toegepast-Natuurwetenschappelijk Onderzoek, ten behoeve van de Voeding, Utrecht, Netherlands, a corporation of the Netherlands No Drawing. Application December 4, 1948, Serial No. 63,612. In the Netherlands December 22, 1947

8 Claims. (Cl. 99—163)

It is generally known, that edible fats, oils and foodstuffs containing fats are apt to be oxidized in the air, which diminishes their usefulness. Thus, for instance, many edible fats become rancid through oxidation and unfit for human consumption. In order to prevent such oxidations many types of compounds, and anti-oxidants have already been proposed. By far the greater part of these anti-oxidants are reducing compounds, such as ascorbic acid, tocopherols, gallates and the like.

It has now been found, that the autoxidation of edible fats, oils and of foodstuffs containing edible fats or oils, may be prevented by providing these substances with a small percentage of tetra alkylthiuramdisulphide. The term "alkyl" here also includes "aralkyl."

Tetra alkylthiumar disulphides are substances having strong fungicidal properties and are often used as such. However, the compounds have never yet been added to edible fats, oils or to foodstuffs containing such fats or oils. Nor was this obvious at all as the tetra alkylthiuram disulphides have oxidizing properties; for example they liberate iodine from potassium iodide.

The value of an anti-oxidant is determined, as is known, by means of the so-called "Swift stability test" set forth in "Oil and Soap" No. 10 of 1933, on pages 105–109 by A. E. King, H. L. Roschen, and W. H. Irwin. This test requires passing a constant stream of purified air through a fat at 99° C. The peroxide value of the fat is determined at regular intervals. Many of the different fats have an induction period during which the fat has a low peroxide value and is still in good condition organoleptically. This period is called the induction period. This period in which the peroxide value rises rapidly with ultimate destruction of the peroxides, while organoleptically the rancidity is clearly perceptible. By the addition of an anti-oxidant the induction period is lengthened although the oxidation period remains about the same as before. This period, therefore, is a measure for determining the action of the anti-oxidant used.

The action of, for example, tetramethyl thiuram disulphide as an anti-oxidant is apparent from the following results obtained by the "Swift-test." As test objects lard and beef fat were used.

Experiment with lard: Without such addition of antioxidant, this sample of lard had an induction period of 5.3 hours. After addition of 0.01% of tetramethyl thiuram disulphide the induction period became 9.4 hours.

Experiment with beef fat: Without addition of antioxidant, the induction period was 2.4 hours. After addition of 0.01%, 0.02% and 0.04% of tetramethyl thiuram disulphide the induction periods become 3.6, 6.6 and 8.8 hours, respectively.

At the same time samples of the same beef fat were stored at 22° C. with and without addition of tetramethyl thiuram disulphide (T. M. T. D.). The results expressed as the peroxide value (P. V.) in milliequivalents pro kg. fat are shown in the following table.

| days | blank | 0.01% T. M. T. D. | 0.02% T. M. T. D. | 0.04% T. M. T. D. |
|---|---|---|---|---|
| 0 | 3.1 | 3.6 | 3.6 | 4.9 |
| 60 | 4.8 | 3.0 | 3.6 | 4.4 |
| 120 | 20.6 | 2.6 | 2.9 | 3.1 |
| 170 | 106 | 2.4 | 2.1 | 2.4 |
| 230 | 216 | 2.4 | 2.3 | 2.5 |
| 325 | 280 | 5.2 | 1.6 | 1.9 |
| 350 | 293 | 4.9 | 1.4 | 1.6 |

From these data two remarkable and unexpected results appear.

1. As generally the action of anti-oxidants in the Swift-test is stronger than in the storing test, in which the reverse action takes place. So the addition of 0.01% tetramethyl-thiuram-disulphide to the beef fat did the stability increase from 2.4 to 3.6 hours in the Swift-test, but from 60 to more than 300 days in the storing test.

2. It appears that the tetra methyl-thiuram-disulphide, especially in the higher concentrations, first—probably as a result of its oxidizing properties—increases the peroxide values but afterwards decreases it to values lower than the original value of the untreated beef fat.

It will be clear, that the proportions of tetra alkylthiuram disulphide to be added depend on the nature of the material to be stabilized. In general these proportions range from 0.005 to 0.1%. As the substances in the concentrations used are quite harmless, as appears from experiments on animals, and moreover do not influence the taste and flavour of the substances to be stabilized, their application, especially in edible fats and oils, or in foodstuffs containing these materials, respectively, is of great importance. They may also be used for stabilizing emulsions of various substances containing oils or fats such as emulsions of vitamins subject to oxidation.

So for instance salad-dressing can be stabilized by dissolving 0.005% tetra-alkylthiuram disulphide in the oil-component (a mixture of arachide- and soya bean oil), and chickenfat by addition of 0.01% dibenzyl-dimethylthiuram disulphide.

I claim:
1. Process for preventing the autoxidation of edible fats, oils, and of foodstuffs containing edible fats or oils, characterized in that a small percentage of an antioxidant tetra alkylthiuram disulphide is incorporated amounting to not more than .1% of the fat or oil involved.
2. Process according to claim 1, characterized in that 0.005–0.1% of tetra alkylthiuram disulphide is incorporated.
3. Process according to claim 1, characterized in that the small percentage of the antioxidant comprises tetra methylthiuram disulphide.
4. Process according to claim 3, in which the small percentage of the antioxidant used comprises from .005% to .1% of tetra methylthiuram disulphide.
5. Edible fats, oils and foodstuffs containing edible fats or oils characterized by inclusion therein of a small content of tetra alkylthiuram disulphide amounting to not more than .1% of the fat or oil involved.
6. Edible fats, oils and foodstuffs containing edible fats or oils characterized by a content of 0.005–0.1% of tetra alkylthiuram disulphide.
7. Edible fats, oils and foodstuffs containing edible fats or oils characterized by a small content of tetra methylthiuram disulphide amounting to not more than .1% of the fat or oil involved.
8. Edible fats, oils and foodstuffs containing edible fats or oils characterized by a content of 0.005–0.1% of tetra methylthiuram disulphide.

FREDERIK D. TOLLENAAR.

No references cited.